US009195309B2

(12) United States Patent
Grokop et al.

(10) Patent No.: US 9,195,309 B2
(45) Date of Patent: Nov. 24, 2015

(54) METHOD AND APPARATUS FOR CLASSIFYING MULTIPLE DEVICE STATES

(75) Inventors: Leonard H. Grokop, San Diego, CA (US); Anthony Sarah, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 248 days.

(21) Appl. No.: 13/244,170

(22) Filed: Sep. 23, 2011

(65) Prior Publication Data

US 2012/0299828 A1     Nov. 29, 2012

Related U.S. Application Data

(60) Provisional application No. 61/490,999, filed on May 27, 2011.

(51) Int. Cl.
| | |
|---|---|
| *G06F 3/033* | (2013.01) |
| *G09G 5/08* | (2006.01) |
| *G09G 5/00* | (2006.01) |
| *G06F 3/01* | (2006.01) |
| *G06F 3/0346* | (2013.01) |

(52) U.S. Cl.
CPC .............. *G06F 3/017* (2013.01); *G06F 3/0346* (2013.01)

(58) Field of Classification Search
CPC    G06F 3/017; G06F 3/0488; G06F 2203/0381
See application file for complete search history.

(56) References Cited

U.S. PATENT DOCUMENTS

| | | | | |
|---|---|---|---|---|
| 5,059,127 | A * | 10/1991 | Lewis et al. | 434/353 |
| 2001/0037667 | A1* | 11/2001 | Leroux et al. | 72/39 |
| 2004/0070564 | A1* | 4/2004 | Dawson et al. | 345/156 |
| 2005/0078087 | A1* | 4/2005 | Gates et al. | 345/163 |
| 2005/0219213 | A1 | 10/2005 | Cho et al. | |
| 2006/0253156 | A1 | 11/2006 | Pastore et al. | |
| 2008/0120062 | A1 | 5/2008 | Lee et al. | |
| 2009/0143972 | A1* | 6/2009 | Kitamura et al. | 701/200 |
| 2009/0303204 | A1 | 12/2009 | Nasiri et al. | |

(Continued)

FOREIGN PATENT DOCUMENTS

| | | |
|---|---|---|
| JP | 2008299524 A | 12/2008 |
| JP | 2012529195 A | 11/2012 |

(Continued)

OTHER PUBLICATIONS

International Search Report and Written Opinion—PCT/US2012/038856—ISA/EPO—Aug. 14, 2012.

(Continued)

*Primary Examiner* — Alexander Eisen
*Assistant Examiner* — Nan-Ying Yang
(74) *Attorney, Agent, or Firm* — Kilpatrick Townsend & Stockton LLP (57) ABSTRACT

Techniques are described herein for classifying multiple device states using separate Bayesian classifiers. An example of a method described herein includes accessing sensor information of a device, wherein at least some of the sensor information is used in a first feature set and at least some of the sensor information is used in a second feature set; processing the first feature set using a first classification algorithm configured to determine a first proposed state of a first state type and a first proposed state of a second state type; processing the second feature set using a second classification algorithm configured to determine a second proposed state of the first state type and a second proposed state of the second state type; and determining a proposed state of the device as the first proposed state of the first state type and the second proposed state of the second state type.

30 Claims, 5 Drawing Sheets

(56) References Cited

U.S. PATENT DOCUMENTS

| | | | |
|---|---|---|---|
| 2010/0103108 A1* | 4/2010 | Hotelling et al. | 345/166 |
| 2010/0205061 A1 | 8/2010 | Karmarkar | |
| 2010/0299615 A1 | 11/2010 | Miluzzo et al. | |
| 2011/0316784 A1* | 12/2011 | Bisutti et al. | 345/168 |

FOREIGN PATENT DOCUMENTS

| | | |
|---|---|---|
| KR | 20100126707 A | 12/2010 |
| WO | WO-2006104140 A1 | 10/2006 |
| WO | WO-2009093056 A1 | 7/2009 |
| WO | WO-2010147821 A2 | 12/2010 |

OTHER PUBLICATIONS

Mahdaviani, Maryam, "Semi-Supervised and Active Training of Conditional Random Fields for Activity Recognition," Thesis submitted to University of British Columbia, 2007.

* cited by examiner

METHOD AND APPARATUS FOR CLASSIFYING MULTIPLE DEVICE STATES

CROSS-REFERENCES TO RELATED APPLICATIONS

The present application for patent claims the benefit of U.S. Provisional Application Ser. No. 61/490,999, filed May 27, 2011, and entitled "CLASSIFYING MULTIPLE DEVICE STATES," the entirety of which is incorporated herein by reference.

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

Smartphones and other mobile devices can contain sensors. These sensors may include, but are not limited to, motion sensors such as accelerometers, gyroscopes, etc., and environment sensors such as thermometers, light sensors, microphones, etc. The output of a device's motion sensors is indicative of the movements of the device. The device movements contain information about both the motion state of the user (e.g. sitting, standing, walking, running, etc. . . . ) and the device position with respect to the user (e.g. pocket, backpack, hand, desk, etc. . . . ).

States corresponding to particular sensor outputs can be learned, so that sensor data can subsequently be used to determine unknown device states. For example, during a training procedure, a device configured to execute a classification algorithm (e.g., a Bayesian classifier, etc.) may be exposed to examples of motion state/device position combinations, and may process corresponding sensor data to learn a model for each combination. Then, when presented with a new set of sensor information for an unknown motion state/device position, the classifier will select both the motion state and the device position that have the highest computed likelihoods (or posteriors, if prior probabilities are known).

Such classification algorithms may operate based on identified features and given statistical models. For example, a Gaussian Mixture Model (GMM) with 16 mixture components may be utilized to estimate motion state. As another example, a GMM with 2 mixture components may be utilized to estimate device position. Techniques that provide further improvement of device state classification are desirable.

SUMMARY

An example of a method of classifying a plurality of state types for a device described herein includes accessing sensor information of the device, where at least some of the sensor information is used in a first feature set and at least some of the sensor information is used in a second feature set; processing the first feature set using a first classification algorithm, where the first classification algorithm is configured to determine a first proposed state of a first state type and a first proposed state of a second state type; processing the second feature set using a second classification algorithm, where the second classification algorithm is configured to determine a second proposed state of the first state type and a second proposed state of the second state type; and determining a proposed state of the device as the first proposed state of the first state type and the second proposed state of the second state type.

Implementations of the method may include one or more of the following features. The first state type is a motion state and the second state type is a position state. The sensor information used in the first feature set includes accelerometer output, and the first feature set includes a variance of accelerometer output over a time interval. The sensor information used in the second feature set includes accelerometer output for a plurality of accelerometer axes of a multi-axis accelerometer having at least a first axis and a second axis, and the second feature set includes a mean ratio of acceleration between two accelerometer axes of the multi-axis accelerometer. The first classification algorithm includes a maximize joint likelihood algorithm using the first feature set and a first probability distribution function. The first classification algorithm includes a maximize marginal posterior algorithm using the first feature set and a first probability distribution function. The second classification algorithm includes a maximize joint likelihood algorithm using the second feature set and a second probability distribution function. The second classification algorithm includes a maximize marginal posterior algorithm using the second feature set and a second probability distribution function. The first classification algorithm and the second classification algorithm each include a Bayesian classifier.

An example of a mobile device described herein includes one or more sensors configured to generate sensor output; a feature set generator module communicatively coupled to the one or more sensors and configured to associate respective sensor information indicative of the sensor output to at least one of a first feature set and a second feature set; and a classification module communicatively coupled to the feature set generator module. The classification module is configured to perform operations including processing the first feature set using a first classification algorithm, where the first classification algorithm is configured to determine a first proposed state of a first state type and a first proposed state of a second state type, processing the second feature set using a second classification algorithm, where the second classification algorithm is configured to determine a second proposed state of the first state type and a second proposed state of the second state type, and determining a proposed state of the device as the first proposed state of the first state type and the second proposed state of the second state type.

Implementations of the mobile device may include one or more of the following features. The first state type is a motion state and the second state type is a position state. The one or more sensors include one or more accelerometers, the sensor information used in the first feature set includes accelerometer output, and the first feature set includes a variance of accelerometer output over a time interval. The one or more sensors include one or more accelerometers, the sensor information used in the second feature set includes accelerometer output for a plurality of accelerometer axes of a multi-axis accelerometer having at least a first axis and a second axis, and the second feature set includes a mean ratio of acceleration between two accelerometer axes of the multi-axis accelerometer. The first classification algorithm includes a maximize joint likelihood algorithm using the first feature set and a first probability distribution function. The first classification algorithm includes a maximize marginal posterior algorithm using the first feature set and a first probability distribution function. The second classification algorithm includes a maximize joint likelihood algorithm using the second feature set and a second probability distribution function. The second classification algorithm includes a maximize marginal posterior algorithm using the second feature set and a second probability distribution function. The first classification algorithm and the second classification algorithm each include a Bayesian classifier.

Another example of a mobile device described herein includes means for accessing sensor information of the device; means for associating at least some of the sensor information with a first feature set; means for associating at least some of the sensor information with a second feature set; means for processing the first feature set using a first classification algorithm, where the first classification algorithm is configured to determine a first proposed state of a first state type and a first proposed state of a second state type; means for processing the second feature set using a second classification algorithm, where the second classification algorithm is configured to determine a second proposed state of the first state type and a second proposed state of the second state type; and means for determining a proposed state of the device as the first proposed state of the first state type and the second proposed state of the second state type.

Implementations of the above mobile device may include one or more of the following features. The first state type is a motion state and the second state type is a position state. The sensor information associated with the first feature set includes accelerometer output, and the first feature set includes a variance of accelerometer output over a time interval. The sensor information associated with the second feature set includes accelerometer output for a plurality of accelerometer axes of a multi-axis accelerometer having at least a first axis and a second axis, and the second feature set includes a mean ratio of acceleration between two accelerometer axes of the multi-axis accelerometer. The first classification algorithm includes at least one of a maximize joint likelihood algorithm or a maximize marginal posterior algorithm, and the first classification algorithm uses the first feature set and a first probability distribution function. The second classification algorithm includes at least one of a maximize joint likelihood algorithm or a maximize marginal posterior algorithm, and the second classification algorithm uses the second feature set and a second probability distribution function.

An example of a computer program product described herein resides on a processor-readable medium and includes processor-readable instructions configured to cause a processor to access sensor information of a device, where at least some of the sensor information is used in a first feature set and at least some of the sensor information is used in a second feature set; process the first feature set using a first classification algorithm configured to determine a first proposed state of a first state type and a first proposed state of a second state type; process the second feature set using a second classification algorithm configured to determine a second proposed state of the first state type and a second proposed state of the second state type; and determine a proposed state of the device as the first proposed state of the first state type and the second proposed state of the second state type.

Implementations of the computer program product may include one or more of the following features. The first state type is a motion state and the second state type is a position state. The sensor information used in the first feature set includes accelerometer output, and the first feature set includes a variance of accelerometer output over a time interval. The sensor information used in the second feature set includes accelerometer output for a plurality of accelerometer axes of a multi-axis accelerometer having at least a first axis and a second axis, and the second feature set includes a mean ratio of acceleration between two accelerometer axes of the multi-axis accelerometer. The first classification algorithm includes at least one of a maximize joint likelihood algorithm or a maximize marginal posterior algorithm, and the first classification algorithm uses the first feature set and a first probability distribution function. The second classification algorithm comprises at least one of a maximize joint likelihood algorithm or a maximize marginal posterior algorithm, and the second classification algorithm uses the second feature set and a second probability distribution function.

DETAILED DESCRIPTION

Techniques are described herein for classifying a plurality of device state types by utilizing a plurality of classifiers. In an embodiment, a plurality of device state types are classified using a corresponding number of classifiers, with each classifier optimized for and outputting a proposed state value for one particular state. Alternatively, in another embodiment, separate joint classifiers of multiple device states are used. In an example in which motion and position states are classified, the first classifier uses a feature set and statistical model that have been optimized for classifying a motion state, while the second classifier uses a feature set and statistical model that have been optimized for classifying device position. Each classifier outputs a joint estimate of both motion state and device position, but the first classifier (i.e., the motion state classifier) discards or disregards its output for device position, and the second classifier (i.e., the device position classifier) discards or disregards its output for motion state. While various examples herein are presented in the context of classifying position and motion states, this disclosure is not intended to be limited to any specific example(s), and classification of other states is also possible.

Items and/or techniques described herein may provide one or more of the following capabilities, as well as other capabilities not mentioned. Device state classification can be performed with improved performance and accuracy. Estimation of multiple device states, such as motion and position, can be performed in a single set of operations without compromising accuracy of the estimations. Mobile devices and applications configured to run on mobile devices can operate with increased flexibility and adaptability to changes in the surrounding environment. While at least one item/technique-effect pair has been described, it may be possible for a noted effect to be achieved by means other than that noted, and a noted item/technique may not necessarily yield the noted effect.

Figure 1:
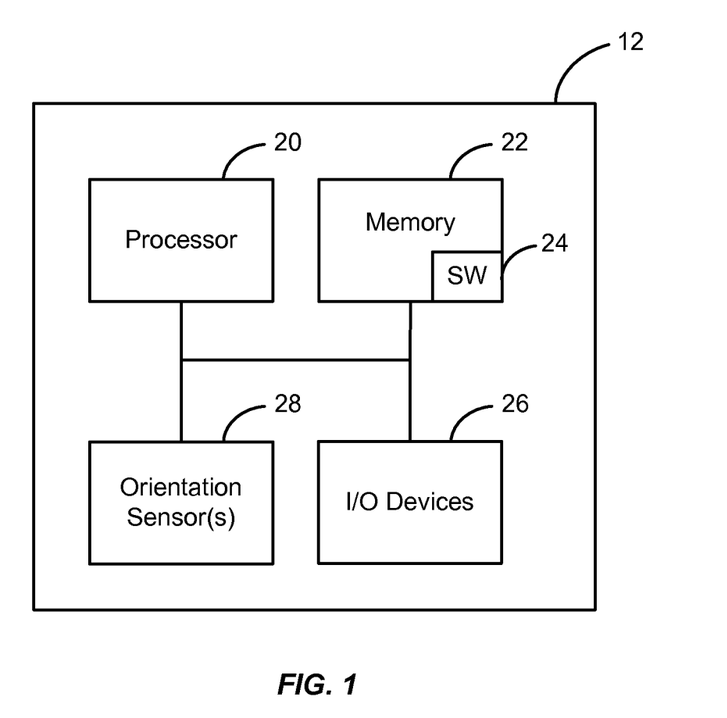
FIG. 1 is a block diagram of components of a computing device.

Referring to FIG. 1, an example computing device 12 comprises a processor 20, memory 22 including software 24, input/output (I/O) device(s) 26 (e.g., a display, speaker, keypad, touch screen or touchpad, etc.), and one or more orientation sensors 28. Additionally, the device 12 may include other components not illustrated in FIG. 1, such as a network interface that facilitates bi-directional communication between the device 12 and one or more network entities, and/or any other suitable component(s).

The processor 20 is an intelligent hardware device, e.g., a central processing unit (CPU) such as those made by Intel® Corporation or AMD®, a microcontroller, an application specific integrated circuit (ASIC), etc. The memory 22 includes non-transitory storage media such as random access memory (RAM) and read-only memory (ROM). The memory 22 stores the software 24 which is computer-readable, computer-executable software code containing instructions that are configured to, when executed, cause the processor 20 to perform various functions described herein. Alternatively, the software 24 may not be directly executable by the processor 20 but is configured to cause the computer, e.g., when compiled and executed, to perform the functions.

Figure 2:
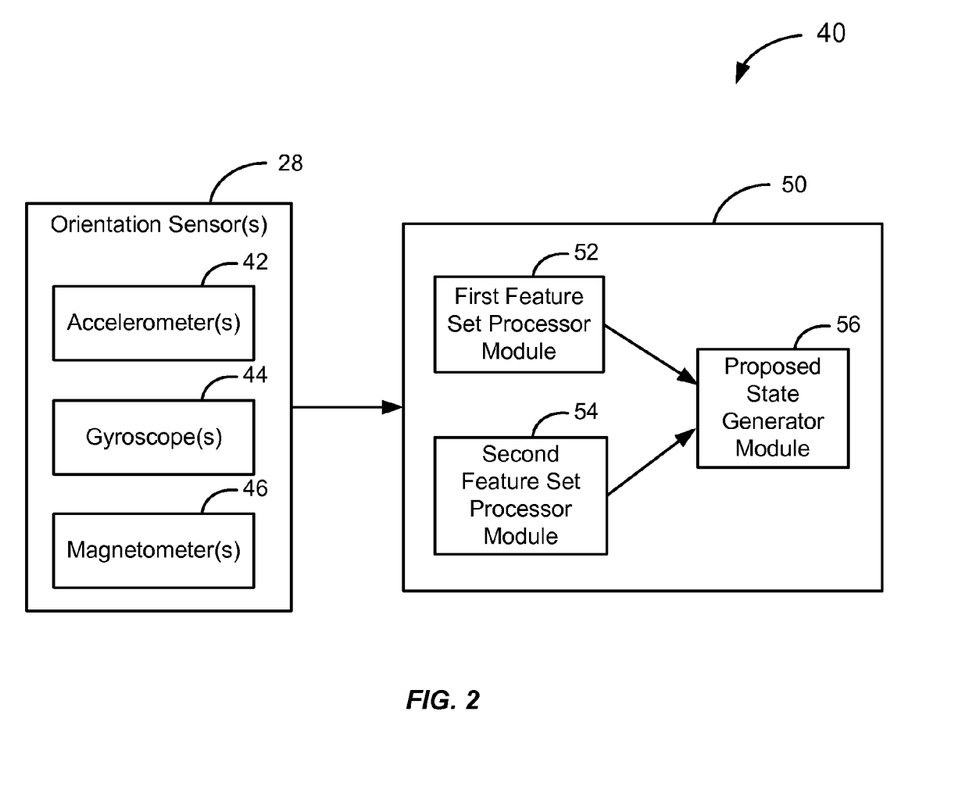
FIG. 2 is a block diagram of a system for classification of multiple device states.

The orientation sensors 28 are configured to collect data relating to motion, position and/or orientation of the device 12 as well as changes in such properties over time. Referring also to FIG. 2, the orientation sensors 28 can include, e.g., one or more accelerometers 42, gyroscopes (gyros) 44, magnetometers 46, or the like. The orientation sensors 28 are configured to provide information from which the motion, position and/or orientation of a device 12 can be determined. Respective orientation sensors 28 associated with a device 12 can be employed to measure a single axis or multiple axes. For multi-axis measurement, multiple single-axis accelerometers and/or multi-axis (e.g., two-axis or three-axis) accelerometers can be employed to measure motion with respect to linear axes (e.g., x-y-z, north-east-down, etc.), and multiple single-axis gyroscopes and/or multi-axis gyroscopes can be employed to measure motion with respect to angular axes (e.g., roll, pitch or yaw).

The orientation sensors 28 can provide information over time, e.g., periodically, such that present and past orientations, positions and/or motion directions can be compared to determine changes in the motion direction, position and/or orientation of the device 12. The gyroscope 44 can provide information as to motion of the device 12 affecting the orientation. The accelerometer 42 is configured to provide information as to gravitational acceleration such that the direction of gravity relative to the device 12 can be determined. The magnetometer 46 is configured to provide an indication of the direction, in three dimensions, of magnetic north relative to the device 12, e.g., with respect to true north or magnetic north. Conversion mechanisms based on magnetic declination and/or other suitable means can be utilized to convert a direction with respect to true north to a direction with respect to magnetic north, and vice versa.

As stated above, computing devices 12 (e.g., smartphones, laptop or tablet computers, personal digital assistants (PDAs), etc.) contain sensors that provide various types of information. For example, orientation sensors 28 provide output indicative of the movements of an associated device 12. In turn, the device movements contain information about both the motion state of the user of the device (e.g. sitting, standing, walking, running, etc. . . . ) and the device position with respect to the user (e.g. pocket, backpack, hand, desk, etc. . . . ).

As further discussed above, states corresponding to particular sensor outputs can be learned such that sensor data can subsequently be used to determine unknown device states. For example, during a training procedure, a device configured to execute a classification algorithm may be exposed to examples of motion state/device position combinations, and may process corresponding sensor data to learn a model for each combination. Subsequently, when presented with a new set of sensor information for an unknown motion state and/or device position, the classifier selects both the motion state and the device position that have the highest computed likelihoods (or posteriors, if prior probabilities are known).

A classification algorithm such as a Bayesian classifier can be used to classify multiple device states based on sensor information. For example, information from one or more sensors can be provided to a Bayesian classifier to jointly classify motion state and device position based on the sensor information. This can be done, e.g., (1) by choosing the specific motion state/device position combination with the highest joint likelihood or posterior, or (2) by initially marginalizing (i.e., summing the likelihoods) over device position, computing the motion state with the highest marginal likelihood or posterior, and then marginalizing over motion state and computing the device position with the highest marginal likelihood/posterior.

The two approaches outlined above can be summarized as follows. With reference first to maximizing the joint likelihood, the motion state $\hat{\omega}_{emotion}$ and device position $\hat{\omega}_{position}$ are first selected according to:

$$(\hat{\omega}_{motion}, \hat{\omega}_{position}) = \arg\max_{\omega_{motion}, \omega_{position}} P(f|\omega_{motion}, \omega_{position}),$$

where $\hat{\omega}_{emotion}$ denotes the motion state being optimized over, $\omega_{position}$ denotes the device position being optimized over, and f denotes the feature vector. Similarly, the solution for maximizing the joint posterior is:

$$(\hat{\omega}_{motion}, \hat{\omega}_{position}) = \arg\max_{\omega_{motion}, \omega_{position}} P(f|\omega_{motion}, \omega_{position}) P(\omega_{motion}, \omega_{position})$$

where $P(\omega_{motion}, \omega_{position})$ denotes the prior probability of the user being in motion state $\omega_{motion}$ and having their device in position $\omega_{position}$.

Referring next to maximizing the marginal likelihoods and/or posterior, the motion state is first selected according to the following:

$$\hat{\omega}_{motion} = \arg\max_{\omega_{motion}} \sum_{\omega_{position}} P(f \mid \omega_{motion}, \omega_{position}).$$

Second, the device position is selected according to:

$$\hat{\omega}_{position} = \arg\max_{\omega_{position}} \sum_{\omega_{motion}} P(f \mid \omega_{motion}, \omega_{position}).$$

Similarly, the solution for maximizing the marginal posterior is given by:

$$\hat{\omega}_{motion} =$$
$$\arg\max_{\omega_{motion}} \sum_{\omega_{position}} P(f \mid \omega_{motion}, \omega_{position}) P(\omega_{motion}, \omega_{position}),$$

and $$\hat{\omega}_{position} = \arg\max_{\omega_{position}} \sum_{\omega_{motion}} P(f \mid \omega_{motion}, \omega_{position}) P(\omega_{motion}, \omega_{position}).$$

The two approaches described above utilize the same set of features and the same statistical models for classifying both motion state and device position. However, this common usage results in significant losses to classification quality, as the features and statistical models that yield the best motion state classification results differ significantly from those that yield the best device position classification results. For example, using a GMM with 16 mixture components may result in an accurate estimate of motion state, but a poor estimate of device position, whereas using a GMM with 2 mixture components may result in an accurate estimate of device position, but a poor estimate of motion state. As another example, including a particular feature f_motion in a classifier may boost the accuracy of classifying motion state, but degrade the accuracy of classifying of device position; conversely, a feature f_position may boost the accuracy of classifying device position, but degrade the accuracy of classifying motion state.

Systems and techniques herein provide for a plurality of classifiers to classify a plurality of device state types. For instance, as illustrated by system 40 in FIG. 2, one or more orientation sensors 28 and/or other sensors provide sensor outputs to a classification module 50, which in turn classifies a plurality of device state types represented by the sensor output. To classify a plurality of device state types, a corresponding number of classifiers can be utilized, with each classifier optimized for and outputting a proposed state value for one particular state. Alternatively, separate joint classifiers of multiple device states may be used. For instance, sensor output can be associated with a first feature set and a second feature set, which are classified by a first feature set processor module 52 and a second feature set processor module 54, respectively. Modules 52-54 provide candidate states to a proposed state generator 56, which is configured to generate a proposed and/or estimated device state from the candidate states.

In the example of motion and position states, the first classifier uses a feature set and statistical model that have been optimized for classifying a motion state, while the second classifier uses a feature set and statistical model that has been optimized for classifying device position. Each classifier outputs a joint estimate of both motion state and device position, but the first classifier (i.e., the motion state classifier) discards or disregards its output for device position, and the second classifier (i.e., the device position classifier) discards or disregards its output for motion state.

Figure 3:
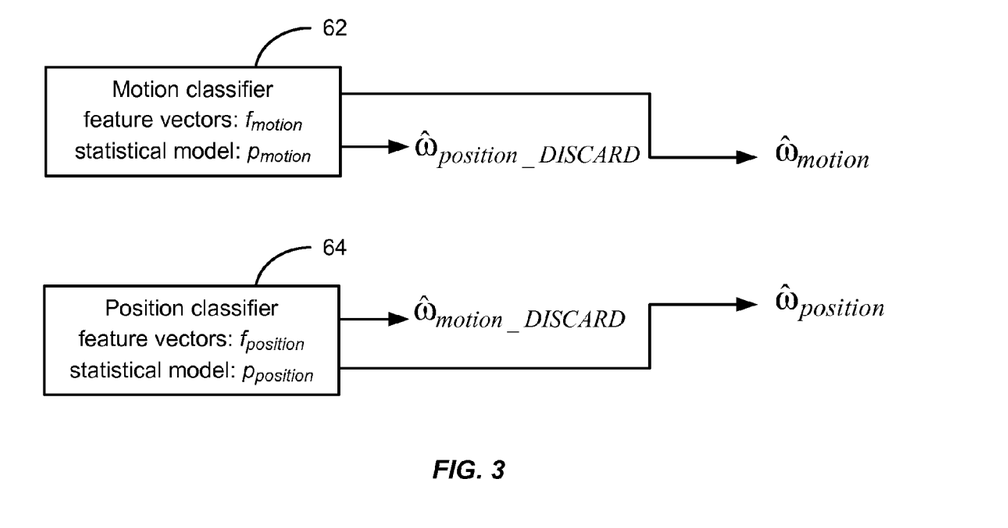
FIGS. 3-4 are illustrative views of respective classifiers associated with various state classification techniques.
Figure 4:
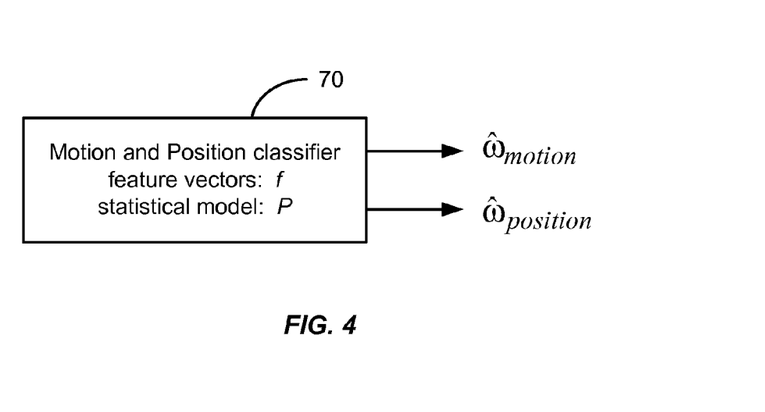

The above approach is summarized below for the two example classifiers described above and illustrated by classifiers 62-64 in FIG. 3. Further, said approach is contrasted with a technique that utilizes a single classifier 70, as illustrated in FIG. 4. The above approach is illustrated with respect to algorithms: (1) maximizing the joint likelihood with separate classifiers, and (2) maximizing the marginal likelihoods and/or posterior with separate classifiers. Other algorithms are also possible.

Referring first to maximizing the joint likelihood with separate classifiers, the motion state $\hat{\omega}_{motion}$ is initially selected according to:

$$(\hat{\omega}_{motion}, \hat{\omega}_{position_{DISCARD}}) = \arg\max_{(\omega_{motion}, \omega_{position})} P_{motion}(f_{motion}|\omega_{motion}, \omega_{position})$$

and the device position $\hat{\omega}_{position}$ is selected according to:

$$(\hat{\omega}_{motion_{DISCARD}}, \hat{\omega}_{position}) = \arg\max_{(\omega_{motion}, \omega_{position})} P_{position}(f_{position}|\omega_{motion}, \omega_{position})$$

wherein $\omega_{motion}$ denotes the motion state over which optimization is performed and $\omega_{position}$ denotes the device position over which optimization is performed. The parameters $P_{motion}$ and $P_{position}$ denote the probability distribution functions (PDFs) when the statistical models are optimized for motion state classification and device position classification, respectively. Likewise, $f_{motion}$ and $f_{position}$ denote the feature vectors used for motion state classification and device position classification, respectively. As described above, the parameters $\hat{\omega}_{motion_{DISCARD}}$ and $\hat{\omega}_{position_{DISCARD}}$ are discarded estimates.

Similarly, the solution for maximizing the joint posterior is given as follows:

$$(\hat{\omega}_{motion}, \hat{\omega}_{position_{DISCARD}}) = \arg\max_{(\omega_{motion}, \omega_{position})} P_{motion}(f_{motion}|\omega_{motion}, \omega_{position}) P(\omega_{motion}, \omega_{position})$$

for the motion state, and:

$$(\hat{\omega}_{motion_{DISCARD}}, \hat{\omega}_{position}) = \arg\max_{(\omega_{motion}, \omega_{position})} P_{position}(f_{position}|\omega_{motion}, \omega_{position}) P(\omega_{motion}, \omega_{position})$$

for device position.

Referring next to the case in which the marginal likelihoods and/or posterior are maximized with separate classifiers, the motion state is initially selected via the following:

$$\hat{\omega}_{motion} = \arg\max_{\omega_{motion}} \sum_{\omega_{position}} P(f_{motion} | \omega_{motion}, \omega_{position}).$$

Next, the device position is selected via the following:

$$\hat{\omega}_{position} = \arg\max_{\omega_{position}} \sum_{\omega_{motion}} P(f_{position} | \omega_{motion}, \omega_{position}).$$

Similarly, the solution for maximizing the marginal posterior is given as follows:

$$\hat{\omega}_{motion} = \arg\max_{\omega_{motion}} \sum_{\omega_{position}} P(f_{position} | \omega_{motion}, \omega_{position}) P(\omega_{motion}, \omega_{position}),$$

and $$\hat{\omega}_{position} = \arg\max_{\omega_{position}} \sum_{\omega_{motion}} P(f_{position} | \omega_{motion}, \omega_{position}) P(\omega_{motion}, \omega_{position}).$$

The following example illustrates the techniques described above for a device with a multi-axis accelerometer having two Bayesian classification algorithms. The two classification algorithms are each configured to classify two state types: a motion state and a position state. However, as described above, one classification algorithm is optimized to classify motion and the other classification algorithm is optimized to classify position. In this example, the device has two possible motion states (sitting and walking) and two possible position states (in the user's hand and in the user's pocket). As a result, there are four possible combinations: sitting/hand, sitting/pocket, walking/hand, and walking/pocket.

Different motion states correspond to different accelerometer profiles. For example, sitting and walking can be differentiated by processing the variance of the accelerometer output over a data acquisition time. However, the variance of the accelerometer output is generally less sensitive to position. Thus, the variance of the accelerometer output may not provide a determination of whether the device is in the user's hand or in the user's pocket with a high confidence level.

By contrast, different position states generally correspond to different device orientations. For the example of a multi-axis accelerometer, the mean ratio of acceleration between the accelerometer axes is indicative of the orientation of the device, and can be used to differentiate between position states with relatively high confidence, while determining the motion state of the device with relatively low confidence.

For the current example, one of the two classification algorithms uses a feature set and statistical model configured to determine a motion state of the device with high confidence, while the other uses a feature set and statistical model configured to determine a position state of the device with high confidence. The motion classifier feature set uses the output of the accelerometer to determine the variance of the accelerometer output over a time interval and determines a proposed motion state value with a relatively high confidence, while it determines a proposed position state value with a relatively low confidence. The proposed position state value is discarded or disregarded. The position classifier feature set uses the accelerator output to determine the mean ratio of acceleration between axes of the accelerometer and determines a proposed position state value with a relatively high confidence and a proposed motion state value with a relatively low confidence. The proposed motion state value is discarded or disregarded.

The technique described above can produce output such as that illustrated by Table 1 below:

TABLE 1

Output of an example classifier pair.

| | Output of motion classifier | Output of position classifier | Device state |
|---|---|---|---|
| Sitting | X | X | X |
| Walking | | | |
| Pocket | X | | |
| Hand | | X | X |

As Table 1 illustrates, both the motion classifier and the position classifier determine that the motion state is sitting. The motion classifier determines that the position state of the device is in the pocket, while the position classifier determines that the position state of the device is in the hand. The resulting device state is that the user is sitting and holding the device in his hand, since the output of the motion classifier for position is disregarded.

In order to accurately classify device states, the classification algorithms may be trained. For instance, sensor data may be obtained when the user has the device in his pocket, and the obtained data can be used to set one or more parameters of the classification algorithms to enable a later determination that sensor information indicates that the position state is "pocket." Sensor information can be collected for combinations of motion/position states (e.g., standing/in hand, walking/in hand, standing/in pocket, walking/in pocket, etc.) to create separate feature sets and statistical models for each classifier based on information from known motion/position states. This "training" may occur before the classifiers are used to classify unknown motion/position states. In some embodiments, training may occur after initial use. For example, the user may be able to and/or prompted to indicate the value of a particular state type based on inaccurate results, ambiguous results, or other circumstances.

While the above example utilizes two state types (i.e., a motion state and a position state), more than two device states can be classified, and each device state type can have its own group of possible states. Further, each group of possible states may include any number of states. Additionally, some state types may use only motion sensor information, while other state types may use environmental or other sensor information instead of, or in addition to, motion sensor information. These, as well as other, techniques, are possible as described above.

Figure 5:
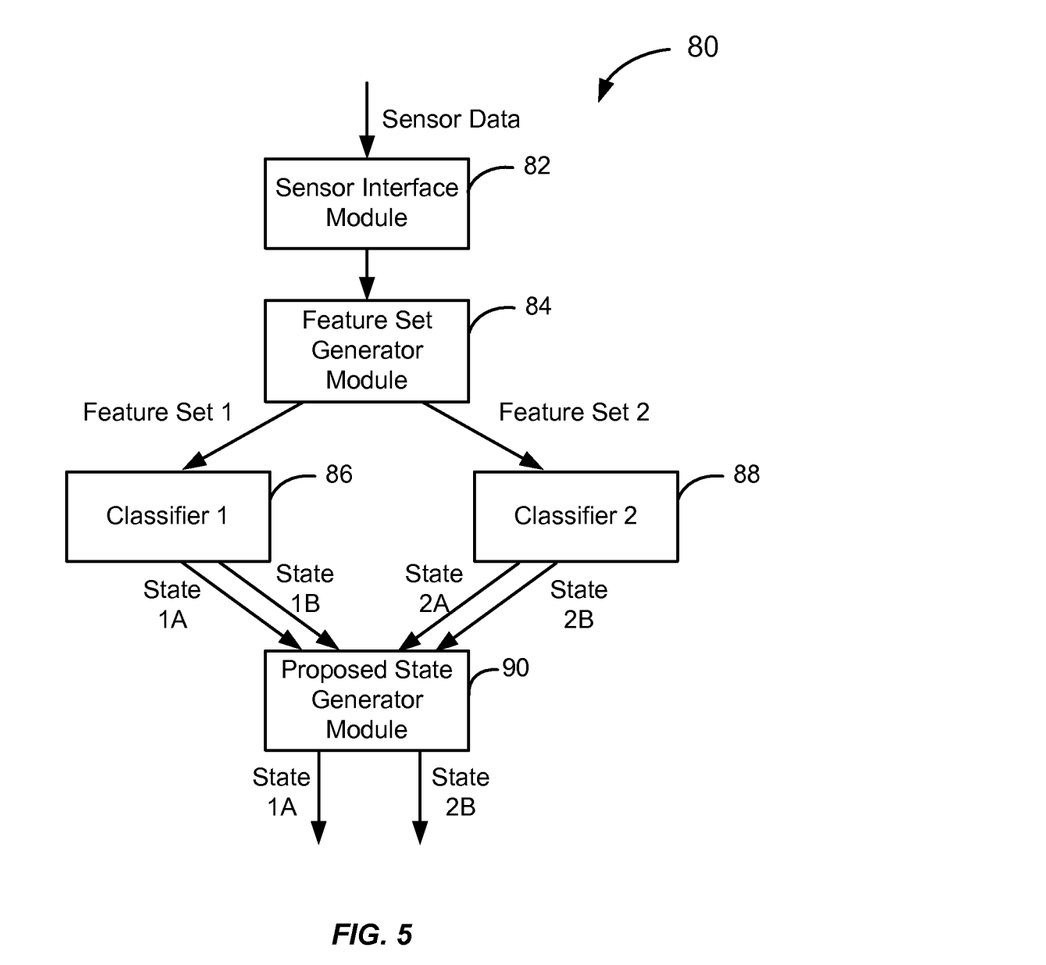
FIG. 5 is a block diagram of a system for jointly classifying multiple states of a device using separate classifiers.

Referring next to FIG. 5, a system 80 for classifying multiple device states includes a sensor interface module 82 configured to access sensor information of a device (e.g., sensor output generated by one or more sensors). A feature set generator 84 associates respective sensor information indicative of the sensor output with at least a first feature set and a second feature set, such that at least some of the sensor information is associated with the first feature set and at least some of the sensor information is associated with the second feature set.

The first feature set and the second feature set are processed by a first classifier 86 and a second classifier 88, respectively. The first classifier 86 processes the first feature set using a first classification algorithm that is configured to determine a first proposed state of a first state type (e.g., motion, etc.) and a first proposed state of a second state type (e.g., position, etc.). These proposed states are shown on FIG. 5 as states 1A and 1B, respectively. The second classifier 88 processes the second feature set using a second classification algorithm that is configured to determine a second proposed state of the first state type and a second proposed state of the second state type. These proposed states are shown on FIG. 5 as states 2A and 2B, respectively. Based on the proposed states output by the classifiers 86-88, a proposed state generator module 56 determines a proposed state of the device as the first proposed state of the first state type and the second proposed state of the second state type (i.e., states 1A and 2B).

All or part of the modules shown by FIG. 5 can be implemented, wholly or in part, by a classification module 50, as standalone components, etc. For instance, the classification module 50 may implement the functionality of classifiers 86-88 (e.g., via the first feature set processor module 52 and second feature set processor module 54) and proposed generator state module 56. Further, the modules shown in FIGS. 2 and 5 may be implemented in hardware, in software (e.g., by a processor 20 executing instructions in software 24 stored on a memory 22), or a combination of hardware and software.

Figure 6:
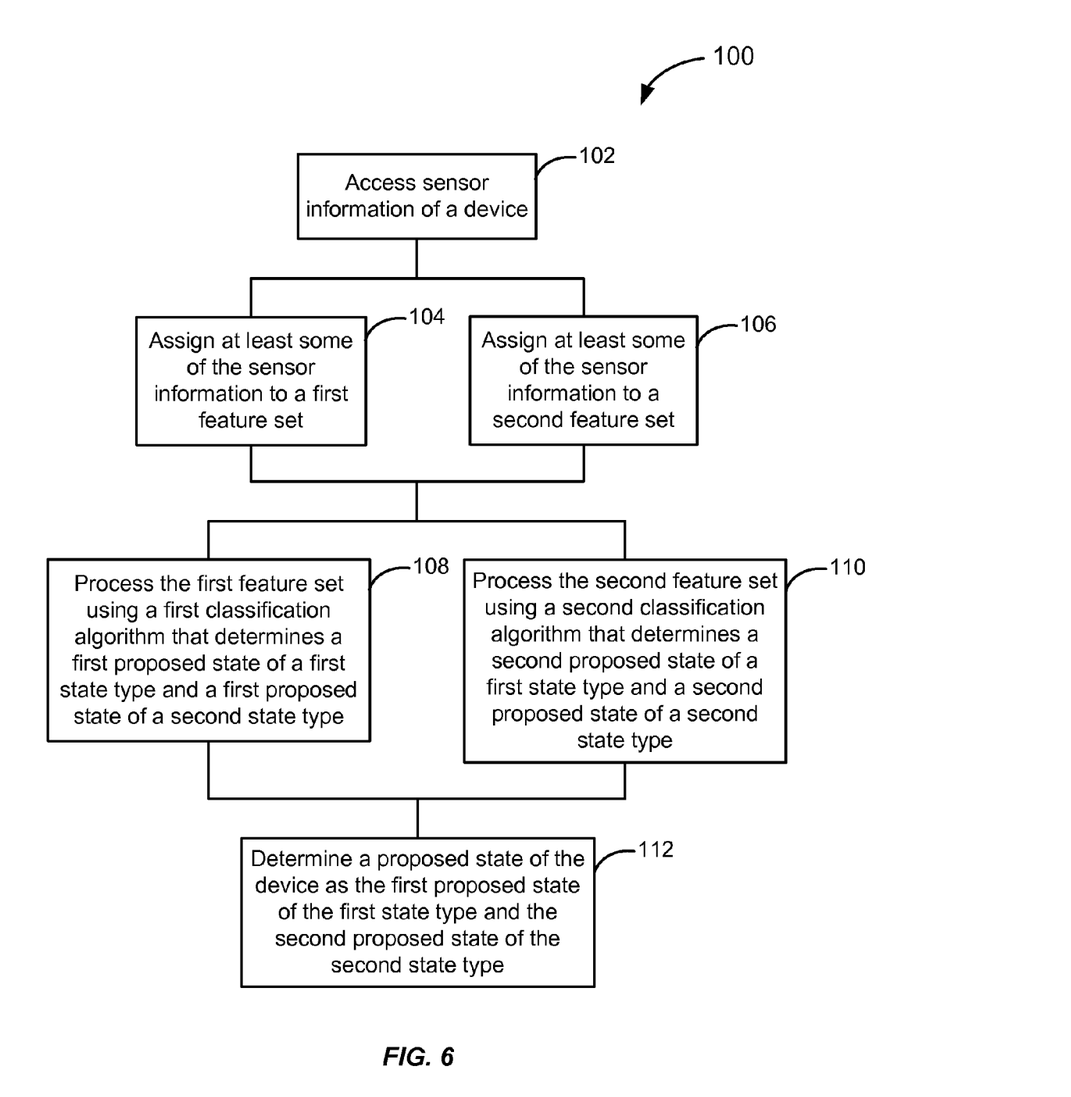
FIG. 6 is a block flow diagram of a process of classifying multiple states associated with a device.

Referring to FIG. 6, with further reference to FIGS. 1-5, a process 100 of classifying multiple states associated with a device includes the stages shown. The process 100 is, however, an example only and not limiting. The process 100 can be altered, e.g., by having stages added, removed, rearranged, combined, and/or performed concurrently. Still other alterations to the process 100 as shown and described are possible.

At stage 102, sensor information of a device (e.g., sensor outputs of one or more orientation sensors 28 and/or other sensors) is accessed. Such access can be performed by, e.g., a classification module 50, a sensor interface module 82, etc.

The process 100 proceeds to stages 104 and 106 from stage 102, where at least some of the sensor information accessed at stage 102 is assigned to a first feature set and a second feature set, respectively. Associations between sensor information and feature sets can be performed by a feature set generator module 84, the respective classifiers 86-88 configured to process the respective feature sets, etc.

From stages 104 and 106, the process 100 proceeds to stages 108 and 110. At stage 108, the first feature set is processed (e.g., by a first feature set processor module 52, a classifier 86, etc.) using a first classification algorithm that is configured to determine a first proposed state of a first state type and a first proposed state of a second state type. At stage 110, the second feature set is processed (e.g., by a second feature set processor module 54, a classifier 88, etc.) using a second classification algorithm that is configured to determine a second proposed state of the first state type and a second proposed state of the second state type. The process 100 then concludes at stage 112, where a proposed state of the device is determined (e.g., by a proposed state generator module 56, etc.) as the first proposed state of the first state type determined at stage 108 and the second proposed state of the second state type determined at stage 110.

One or more of the components, steps, features and/or functions illustrated in FIGS. 1, 2, 3, 4, 5 and/or 6 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4 and/or 5 may be configured to perform one or more of the methods, features, or steps described in FIG. 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of classifying a plurality of state types for a device, the method comprising:
  accessing sensor information from a plurality of sensors of the device, wherein at least some of the sensor information is used in a first set of sensor information and at least some of the sensor information is used in a second set of sensor information;
  processing the first set of sensor information using a first classification algorithm, wherein the first classification algorithm is configured to determine a first proposed state of a first state type and a first proposed state of a second state type;
  processing the second set of sensor information using a second classification algorithm, wherein the second classification algorithm is configured to determine a second proposed state of the first state type and a second proposed state of the second state type, wherein the first proposed state of the first state type is different than the second proposed state of the first state type; and
  after completion of the processing of the first set of sensor information and the processing of the second set of sensor information, determining a proposed state of the device as the first proposed state of the first state type and the second proposed state of the second state type based on the results of the processing of the first set of sensor information and the processing of the second set of sensor information.

2. The method of claim 1 wherein the first state type is a motion state and the second state type is a position state.

3. The method of claim 2 wherein:
  the sensor information used in the first set of sensor information includes accelerometer output, and
  the first set of sensor information includes a variance of accelerometer output over a time interval.

4. The method of claim 2 wherein:
the sensor information used in the second set of sensor information includes accelerometer output for a plurality of accelerometer axes of a multi-axis accelerometer having at least a first axis and a second axis, and
the second set of sensor information includes a mean ratio of acceleration between two accelerometer axes of the multi-axis accelerometer.

5. The method of claim 1 wherein the first classification algorithm comprises a maximize joint likelihood algorithm using the first set of sensor information and a first probability distribution function.

6. The method of claim 1 wherein the first classification algorithm comprises a maximize marginal posterior algorithm using the first set of sensor information and a first probability distribution function.

7. The method of claim 1 wherein the second classification algorithm comprises a maximize joint likelihood algorithm using the second set of sensor information and a second probability distribution function.

8. The method of claim 1 wherein the second classification algorithm comprises a maximize marginal posterior algorithm using the second set of sensor information and a second probability distribution function.

9. The method of claim 1 wherein the first classification algorithm and the second classification algorithm each comprise a Bayesian classifier.

10. A mobile device comprising:
one or more sensors configured to generate sensor output;
a feature set generator module communicatively coupled to the one or more sensors and configured to associate respective sensor information indicative of the sensor output to at least one of a first set of sensor information and a second set of sensor information; and
a classification module communicatively coupled to the feature set generator module and configured to perform operations comprising:
processing the first set of sensor information using a first classification algorithm, wherein the first classification algorithm is configured to determine a first proposed state of a first state type and a first proposed state of a second state type,
processing the second set of sensor information using a second classification algorithm, wherein the second classification algorithm is configured to determine a second proposed state of the first state type and a second proposed state of the second state type, wherein the first proposed state of the first state type is different than the second proposed state of the first state type, and
determining a proposed state of the device as the first proposed state of the first state type and the second proposed state of the second state type.

11. The device of claim 10 wherein the first state type is a motion state and the second state type is a position state.

12. The device of claim 11 wherein:
the one or more sensors include one or more accelerometers,
the sensor information used in the first set of sensor information includes accelerometer output, and
the first set of sensor information includes a variance of accelerometer output over a time interval.

13. The device of claim 11 wherein:
the one or more sensors include one or more accelerometers,
the sensor information used in the second set of sensor information includes accelerometer output for a plurality of accelerometer axes of a multi-axis accelerometer having at least a first axis and a second axis, and
the second set of sensor information includes a mean ratio of acceleration between two accelerometer axes of the multi-axis accelerometer.

14. The device of claim 10 wherein the first classification algorithm comprises a maximize joint likelihood algorithm using the first set of sensor information and a first probability distribution function.

15. The device of claim 10 wherein the first classification algorithm comprises a maximize marginal posterior algorithm using the first set of sensor information and a first probability distribution function.

16. The device of claim 10 wherein the second classification algorithm comprises a maximize joint likelihood algorithm using the second set of sensor information and a second probability distribution function.

17. The device of claim 10 wherein the second classification algorithm comprises a maximize marginal posterior algorithm using the second set of sensor information and a second probability distribution function.

18. The device of claim 10 wherein the first classification algorithm and the second classification algorithm each comprise a Bayesian classifier.

19. A mobile device comprising:
means for accessing sensor information of the device;
means for associating at least some of the sensor information with a first set of sensor information;
means for associating at least some of the sensor information with a second set of sensor information;
means for processing the first set of sensor information using a first classification algorithm, wherein the first classification algorithm is configured to determine a first proposed state of a first state type and a first proposed state of a second state type;
means for processing the second set of sensor information using a second classification algorithm, wherein the second classification algorithm is configured to determine a second proposed state of the first state type and a second proposed state of the second state type, wherein the first proposed state of the first state type is different than the second proposed state of the first state type; and
means for determining a proposed state of the device as the first proposed state of the first state type and the second proposed state of the second state type.

20. The device of claim 19 wherein the first state type is a motion state and the second state type is a position state.

21. The device of claim 20 wherein:
the sensor information associated with the first set of sensor information includes accelerometer output, and
the first set of sensor information includes a variance of accelerometer output over a time interval.

22. The device of claim 20 wherein:
the sensor information associated with the second set of sensor information includes accelerometer output for a plurality of accelerometer axes of a multi-axis accelerometer having at least a first axis and a second axis, and
the second set of sensor information includes a mean ratio of acceleration between two accelerometer axes of the multi-axis accelerometer.

23. The device of claim 19 wherein:
the first classification algorithm comprises at least one of a maximize joint likelihood algorithm or a maximize marginal posterior algorithm, and
the first classification algorithm uses the first set of sensor information and a first probability distribution function.

24. The device of claim 19 wherein:
the second classification algorithm comprises at least one of a maximize joint likelihood algorithm or a maximize marginal posterior algorithm, and
the second classification algorithm uses the second set of sensor information and a second probability distribution function.

25. A computer program product comprising a non-transitory processor-readable medium and processor-readable instructions residing thereon configured to cause a processor to:
access sensor information of a device, wherein at least some of the sensor information is used in a first feature set and at least some of the sensor information is used in a second feature set;
process the first feature set using a first classification algorithm configured to determine a first proposed state of a first state type and a first proposed state of a second state type;
process the second feature set using a second classification algorithm configured to determine a second proposed state of the first state type and a second proposed state of the second state type, wherein the first proposed state of the first state type is different than the second proposed state of the first state type; and
determine a proposed state of the device as the first proposed state of the first state type and the second proposed state of the second state type.

26. The computer program product of claim 25 wherein the first state type is a motion state and the second state type is a position state.

27. The computer program product of claim 26 wherein:
the sensor information used in the first feature set includes accelerometer output, and
the first feature set includes a variance of accelerometer output over a time interval.

28. The computer program product of claim 26 wherein:
the sensor information used in the second feature set includes accelerometer output for a plurality of accelerometer axes of a multi-axis accelerometer having at least a first axis and a second axis, and
the second feature set includes a mean ratio of acceleration between two accelerometer axes of the multi-axis accelerometer.

29. The computer program product of claim 25 wherein:
the first classification algorithm comprises at least one of a maximize joint likelihood algorithm or a maximize marginal posterior algorithm, and
the first classification algorithm uses the first feature set and a first probability distribution function.

30. The computer program product of claim 25 wherein:
the second classification algorithm comprises at least one of a maximize joint likelihood algorithm or a maximize marginal posterior algorithm, and
the second classification algorithm uses the second set of sensor information and a second probability distribution function.

* * * * *